United States Patent Office 2,793,437
Patented May 28, 1957

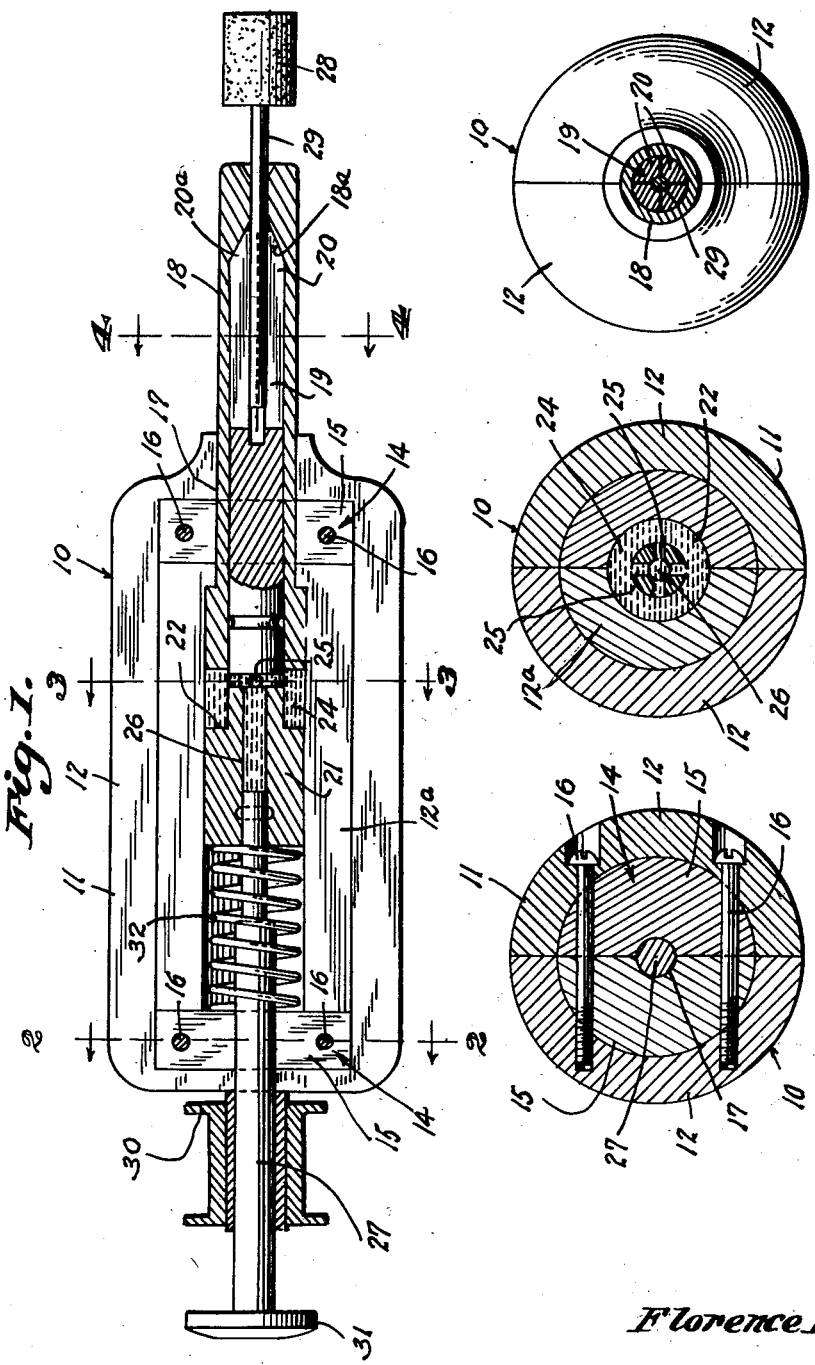
May 28, 1957 — F. H. WILSON — 2,793,437
HYDRAULIC DENTAL SPINDLE
Filed June 15, 1954

2,793,437

HYDRAULIC DENTAL SPINDLE

Florence H. Wilson, Los Angeles, Calif.

Application June 15, 1954, Serial No. 436,965

1 Claim. (Cl. 32—26)

This invention relates to a dental spindle and more particularly to an improved hydraulically actuated dental spindle for use by dental technicians in the manufacture of dentures, bridgework etc.

It is a principal object of this invention to provide a hydraulic dental spindle of the kind to be more particularly described hereinafter having a manually actuated hydraulic chuck for holding or releasing a grinding wheel used for shaping and fitting a denture as by a dental technician.

It is another object of this invention to provide a hydraulic dental spindle of this kind which is actuatable by hand pressure of a dental technician whereby the grinding tool which may be quickly removed for another one without stopping the spindle.

Another object of this invention is to provide a hydraulic dental spindle of this kind which is specially convenient for the use by dental technicians and other persons not particularly skilled in the use of hydraulically actuated chucks which increases the utility of the spindle by providing for many sizes and types of grinding wheels or other similar devices.

Other and further objects and advantages of the invention will be hereinafter described and the novel features thereof defined in the appended claims.

In the drawings:

Fig. 1 is a longitudinal section of a dental spindle constructed according to an embodiment of my invention.

Fig. 2 is a transverse section taken on the line 2—2 of Fig. 1.

Fig. 3 is a transverse section taken on the line 3—3 of Fig. 1.

Fig. 4 is a transverse section taken on the line 4—4 of Fig. 1.

In the manufacture and repair of dentures it is necessary for a dentist and/or technician to use a powered spindle for grinding the denture where and as desired. Such spindles have long been in use by dental technicians and it is an object of this invention to provide a hydraulically actuated dental spindle for clampingly holding a grinding tool or removing the grinding tool therefrom.

The dental spindle constructed according to an embodiment of my invention is designated generally by the reference numeral 10 in the drawings. The dental spindle 10 is formed of an elongated body or housing 11 formed of a pair of outer body sections 12 which are semi-cylindrical in configuration and there is provided a disk 14 at each end of the body 11 also formed in sections which are transversely split apart to provide a pair of disk sections 15.

The disk sections and the body sections 12 are held together by screws 16 which extend through the disk sections and the body sections as clearly indicated in Fig. 2 of the drawings. A split cylinder 12ª is disposed within the body sections 12 and forms a hydraulic cylinder. As the body 11 is open at each end thereof each of the disks 14 is provided with an opening 17 at the center thereof in alignment with the hollow open ended portions of the body 11.

As the body 11 is to hold a clamp for engagement with a grinding tool there is provided an elongated open ended tube 18 extending outwardly from one end of the body, the tube 18 enclosing a collet 19 which is longitudinally split to provide a plurality of collet fingers 20 having tapered forward ends 20ª which are releasably engageable with the grinding tool.

The tube 18 is formed with a conical forward surface 18ª adapted to press the collet fingers together as the collet fingers are moved forwardly.

There is provided a piston 21 slidable in cylinder 12ª and integral with the inner end of the collet 19. The piston 21 is formed with a reservoir 22 intermediate the length thereof and adjacent to the collet 19. The reservoir 22 is to be filled with oil 24 of such a consistency as to flow easily and actuated by a dental technician holding the dental spindle body 11.

The piston 21 is formed with a pair of transverse bores 25 adjacent to the collet 19, the bores 25 being in communication with the reservoir 22 to provide for the free flow of oil. The piston 21 is also formed with a longitudinal bore 26 substantially axially thereof with one end of the longitudinal bore in communication with the transverse bores 25 for the purposes and reasons to be hereinafter more clearly described.

There is provided a plunger 27 which is slidable in the longitudinal bore 26 and one end of the plunger 27 extends outwardly from the dental spindle 10 through one of the openings 17 at the end of the body 11.

A grinding tool 28 which is customary for the use of a technician has a shank 29 which is releasably and clampingly engageable in the collet fingers 20. The collet fingers 20 disposed within the tube 18 are adapted to engage about shank 29 of the grinding tool 28.

It is obvious that when the plunger 27 is moved inwardly piston 21 and collet 17 will be moved inwardly or rearwardly to released position. The release of the shank 29 may be effected either while the collet 19 is rotating or when the collet and grinding tool are at rest.

In order to rotate the collet and grinding tool there is provided a pulley 30 on the plunger 27 exteriorly of the spindle 10 opposite from the collet fingers 20 and the grinding tool 28.

In order to disengage the fingers of the collet there is provided a handle 31 on the plunger 27 outwardly from the body 11 of the dental spindle 10 as clearly shown in Fig. 1 of the drawings.

Inward movement of the plunger 27 by a hand of a dental technician or the like will counteract the effect of the force of the coiled spring 32 within the body 11 so to release the collet fingers 20 from the shank 29 of the grinding tool 28.

In the use and operation of the hydraulic dental spindle described above, a grinding tool is engaged with the collet at the time that the plunger is rotated by an available source of power so that the denture worked upon may be grounded to remove any and all material which the technician desires to have removed therefrom. When a new grinding tool is to be replaced on the dental spindle the technician needs but to press the handle 31 inwardly against the force of the spring, at which time the collet fingers 20 will be released from the grinding tool. At this time the grinding tool may be replaced by another grinding tool at which time the operator or technician may release the handle 31 so that the spring 22, piston 21 and collet fingers 20 will be moved forwardly to tool clamping position.

While the specific details of one embodiment of this invention have been herein shown and described, the invention is not confined thereto as changes and alterations may be made without departing from the spirit and scope thereof as defined in the appended claim.

I claim:

A hydraulic dental spindle comprising a housing, a cylinder in said housing, a tubular member projecting forwardly from said cylinder and formed adjacent the forward end thereof with a collet contracting surface, a piston slidable in said cylinder, a collet integral with said cylinder and projecting forwardly into said tubular member, said piston having a central longitudinal bore and a pair of crossed openings communicating said bore with said cylinder at the forward end of said piston, a spring constantly urging said piston and collet forwardly to tool clamping position, a plunger slidable in said bore, a liquid in said cylinder at the forward end of said piston, a knob on the rear end of said plunger, and a driving pulley on said plunger at the rear of said housing, inward movement of said plunger effecting rearward movement of said piston and movement of said collet to tool releasing position.

References Cited in the file of this patent

UNITED STATES PATENTS

| | | |
|---|---|---|
| 395,252 | Scott | Dec. 25, 1888 |
| 1,815,562 | Godfriaux | July 21, 1931 |